United States Patent
Jeon et al.

(10) Patent No.: US 6,567,381 B1
(45) Date of Patent: May 20, 2003

(54) METHOD AND APPARATUS FOR AUTOMATIC CALL TEST IN A CDMA SYSTEM

(75) Inventors: Young Ki Jeon, Seoul (KR); Young Kon Kim, Taegu (KR); Dae Gun Choi, Seoul (KR); Jae Won Chang, Seoul (KR); Woon Hee Nah, Seoul (KR)

(73) Assignees: Willtech Incorporation, Seoul (KR); Ktfreetel Co, Ltd., Seoul (KR)

(*) Notice: Subject to any disclaimer, the term of this patent is extended or adjusted under 35 U.S.C. 154(b) by 0 days.

(21) Appl. No.: 09/468,094

(22) Filed: Dec. 21, 1999

(51) Int. Cl.[7] .................................................. H04J 3/14
(52) U.S. Cl. ........................ 370/252; 370/242; 370/320; 370/335; 370/342; 455/67.1; 455/423; 714/25
(58) Field of Search ................................. 370/252, 241, 370/241.1, 242, 243, 244, 245, 320, 335, 342; 455/67.1, 67.3, 67.4, 67.6, 67.7, 423, 424, 425, 426; 714/25, 799

Primary Examiner—Dang Ton
Assistant Examiner—Shick Hom
(74) Attorney, Agent, or Firm—Pennie & Edmonds LLP

(57) ABSTRACT

A method automatically measures parameter data relating to wireless network environment in a code division multiple access(CDMA) system. First, if a server's telephone number is detected from power-on registration data stored in a storage device, then a connection with the server is attempted through a mobile station with a data service function using the server's telephone number. Thereafter, if there is test plan program data from the server after the connection is made, the parameter data is measured using another mobile station with a diagnostic monitor function based on the test plan program data. The measured parameter data is then collected and parsed to obtain sets of measured parameter data, each set having a different kind of measured data; and, finally, the sets of measured parameter data are transmitted to the server using the mobile station with the data service function when there is a data transmission request from the server.

20 Claims, 4 Drawing Sheets

METHOD AND APPARATUS FOR AUTOMATIC CALL TEST IN A CDMA SYSTEM

FIELD OF THE INVENTION

The present invention relates to a code division multiple access(CDMA) system; and, more particularly, to a method and apparatus capable of automatically measuring certain parameter data relating to wireless network environments for call testing.

BACKGROUND OF THE INVENTION

In a telecommunications system such as a CDMA system, there is utilized a performance evaluation equipment to evaluate the performance of a base station or for call testing in the system. For the performance evaluation, the equipment is provided with one or more call testers which are installed at a fixed place or in a movable object, e.g., automobile. By using such a call tester, it is possible to measure various parameter data relating to wireless network environments within a service coverage of a base station. The measured parameter data is then sent to a server of the equipment for the performance evaluation.

Specifically, when there is a request from the tester server to obtain parameter data needed for the performance evaluation, the call tester starts to measure the parameter data through a mobile station(or handset) associated therewith under the control of the tester's operator. The mobile station used in the call tester has a diagnostic monitor(DM) function, wherein the parameter data is measured in accordance with a test plan program issued at the server. The test plan program, as known in the art, may include data indicating a call mode, a call type, etc. The call mode data is data indicating whether a mobile station used for the data measurement is in a call origination state or a call termination state. The call type data is data indicating whether the mobile station is in an idle state or a call-by-call state. To be more specific, the idle state represents a state wherein there is no call origination in the mobile station which is powered up, while the call-by-call state stands for a state wherein the call origination, termination and stand by are repeated on a preset time duration basis.

The parameter data measured according to the test plan program is collected and parsed in order to obtain sets of measured parameter data under the control of the operator, each set having a different kind of measured parameter data. The measured parameter data may contain information on date, time, network identification(NID), base station ID(BID), active count, frame error rate(FER) and the like.

In short, the date data represents the date on which the parameter data is measured, while the time data represents the time at which the parameter data is measured. The date data and the time data may be obtained from a global positioning system(GPS) module associated with the call tester. And the NID data indicates a network ID and the BID data indicates a base station ID. The active count data represents the number of active pilot signals which correspond to channels which are available for calls and may be detected from a status response message from the mobile station. The FER data stands for a frame error rate.

The sets of measured parameter data so obtained are then stored in a storage device for transmission to the server upon the server's request thereof. Prior to storing the sets of measured parameter data, they may be decoded by converting them in an appropriate data format. After storing the sets of measured parameter data, when there is a data transmission request from the server, the tester operator controls the tester to transmit the sets of measured parameter data to the server through another mobile station with a data service function using a predefined transmission protocol.

The sets of measured parameter data transmitted from the call tester are received by the server and then stored in a database thereof for use in evaluating the performance of the base station in the equipment.

As explained above, in the conventional call tester, the whole procedure to measure, collect, parse and transmit the parameter data is entirely controlled by the tester's operator. This prior art call tester, therefore, has a shortcoming that it requires an extra operator and is very inconvenient.

SUMMARY OF THE INVENTION

It is, therefore, a primary object of the present invention to provide an automatic call test method and apparatus employing a cost-effective and convenient wireless data measurement scheme.

In accordance with one aspect of the present invention, there is provided a method for automatically measuring parameter data relating to wireless network environments within a service coverage of a base station in a code division multiple access(CDMA) system having at least one call tester and a server, which comprises the steps of:

(a) detecting a server's telephone number from power-on registration data representing a current test state stored in a storage device, wherein the power-on registration data contains information indicating a start, interruption and end of the test in the tester;

(b) attempting, at the call tester, a connection with the server through a mobile station with a data service function using the server's telephone number;

(c) if there is test plan program data from the server after the connection is made, starting to measure the parameter data using another mobile station with a diagnostic monitor(DM) function on the basis of the test plan program data; and (d) collecting and parsing the measured parameter data to obtain sets of measured parameter data, each set having a different kind of measured parameter data, and transmitting the sets of measured parameter data to the server using the mobile station with the data service function when there is a data transmission request from the server.

In accordance with another aspect of the present invention, there is provided an apparatus for automatically measuring parameter data relating to wireless network environments within a service coverage of a base station in a code division multiple access (CDMA) system, which comprises:

means for detecting a server's telephone number from power-on registration data representing a current test state stored in a storage device, wherein the power-on registration data contains information indicating a start, interruption and end of the test in the tester;

means for attempting a connection with the server through a mobile station with a data service function using the server's telephone number;

means for receiving, if there is test plan program data from the server after the connection is made, the test plan program data and measuring the parameter data using another mobile station with a diagnostic monitor (DM) function based on the test plan program data; and means for collecting and parsing the measured parameter data to obtain sets of measured parameter data, each set having a different kind of measured data, and transmitting the sets of measured parameter data to the server when there is a data transmission request from the server.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
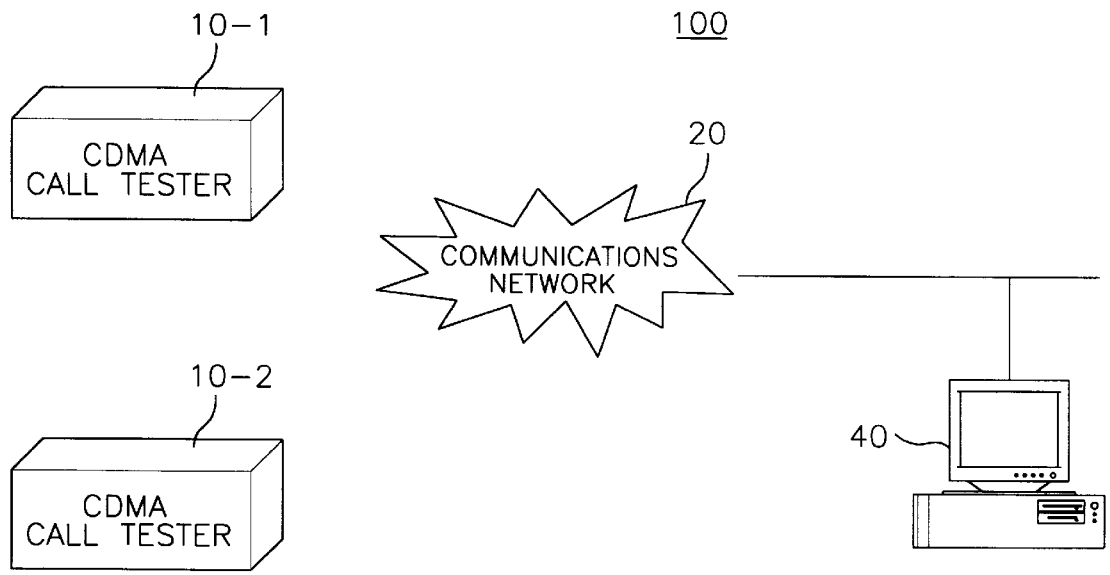
FIG. 1 provides a block diagram of a novel performance evaluation equipment in accordance with the present invention.

Referring to FIG. 1, there is provided a block diagram of a performance evaluation system 100 incorporating therein one or more CDMA call testers, e.g., 10-1 and 10-2, in accordance with the present invention. These CDMA call testers may be installed at any fixed place in a CDMA system(not shown). Alternatively, the testers may be installed in a movable object, e.g., an automobile (not shown); and, in this case, it is possible to measure various parameter data relating to wireless network environments within a service coverage of a base station(not shown) in the CDMA system even when the automobile is moving. By using the CDMA call tester of the invention, it enables the performance evaluation system 100 to automatically measure the parameter data and evaluate the performance of the base station using the measured parameter data.

To be more specific, in the call tester, when there is a test request from a server module 40 connected thereto by radio, parameter data relating to wireless network environments within a service coverage of a base station is automatically measured under the control of the server module 40. After measuring the parameter data, it is automatically sent to the server module 40 through a communications network 20 upon the module 40's request thereof. Therefore, the system 100 does not require operators for the CDMA call testers beside the server module 40's operator; and, thus, it is cost-effective and very convenient.

In accordance with a preferred embodiment of the present invention, the system 100 is capable of measuring new parameter data while transmitting the measured parameter data to the server module 40. Although there is not fully shown in FIG. 1, it should be noted that there are used a mobile station with a data service function and another mobile station with a DM function which are associated with each of the CDMA call testers.

Figure 2:
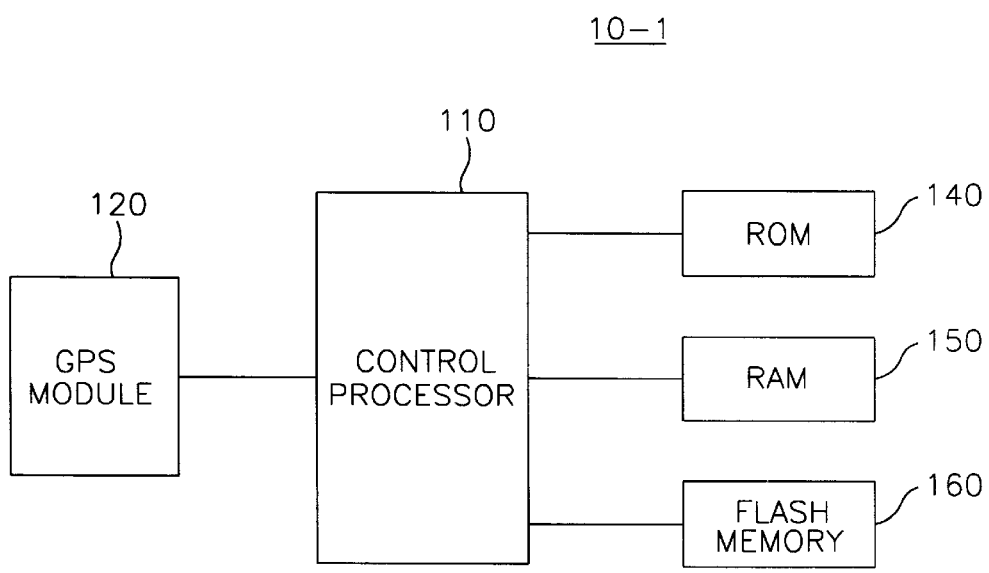
FIG. 2 presents a block diagram of the CDMA call tester shown in FIG. 1.

Turning now to FIG. 2, there is illustrated a block diagram of one of the two CDMA call testers, e.g., 10-1, as depicted in FIG. 1. The CDMA call tester 10-1 includes a control processor 110, a GPS module 120, a read only memory (ROM) 140, a random access memory(RAM) 150 and a flash memory 160.

The control processor 110 is a main processor to control the operation of all devices in the tester 10-1 and manage communications with the server module 40 and the flash memory 160. Also, the processor 110 controls the operation of the mobile stations associated with the tester 10-1. Details of the operation in the processor 110 will be provided with reference to FIG. 3 later. The GPS module 120 provides the control processor 110 with data representing a position at which the tester 10-1 is currently together with data on a current time. In a preferred embodiment of the invention, a GPS developed by Motorola Incorporation may be advantageously used for the above-mentioned purpose.

The ROM 140 stores operating system(OS) and system program and transfers same to the RAM 150 for loading it immediately after a power is supplied to the tester 10-1. The flash memory 160 functions to save all parameter data to be measured and transmits same to the server module 40 through the network 20 upon the request. The memory 160 can maintain all the data stored therein even in the event of a power off; and may also be used as a space for remote upgrade of software programs embedded in the tester 10-1 when needed. Further, the memory 160 stores power-on registration data representing a current test state and provides same to the block 110 when desired. The power-on registration data may include information indicating a start, interruption and end of the test in the tester 10-1, a server's telephone number and the like.

Figure 3:
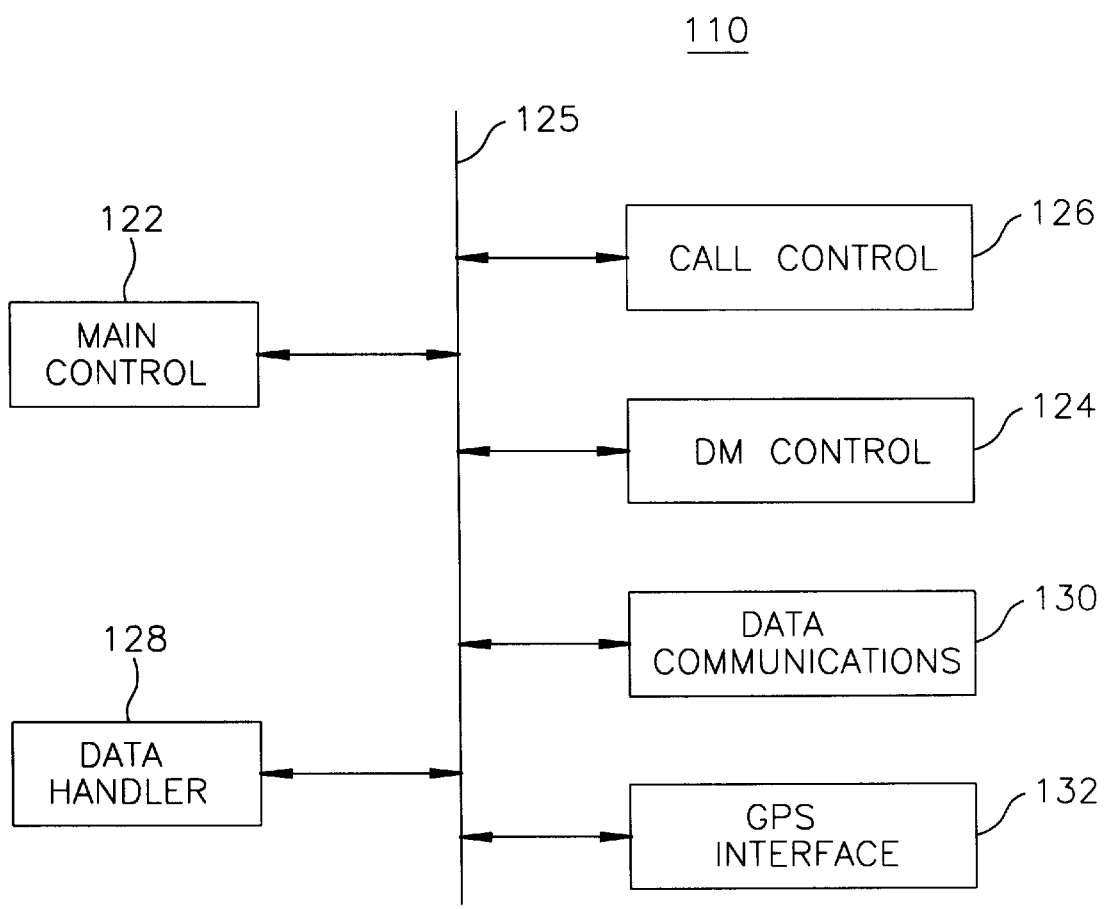
FIG. 3 depicts a detailed block diagram of the control processor shown in FIG. 2.

Referring to FIG. 3, there is illustrated a detailed block diagram of the control processor 110 in accordance with the present invention shown in FIG. 2. The processor 110 includes a main control block 122, a DM control block 124, a call control block 126, a data handler 128, a data communications block 130 and a GPS interface block 132.

Specifically, the main control block 122 is used to control the operation of the whole system and other blocks in the processor 110, as will further be explained later. The DM control block 124 periodically sends a DM data request to the mobile station with the DM function in accordance with a test plan program issued at the server module 40 and relays parameter data measured through the mobile station in response to the request to the call control block 126 for logging it into the flash memory 160. Prior to logging the measured parameter data, the data may be decoded by converting it in an appropriate data format. Details of the test plan program and the measured parameter data will be given when describing the whole procedure of the present invention with reference to FIG. 5 later. The call control block 126 serves to control calls of the mobile stations, and call origination and release in accordance with the test plan program. Also, this block interacts with the DM control block 124 to collect and parse the measured parameter data delivered through the DM control block 124.

The data handler 128 performs function to save the test plan program from the server module 40 into the flash memory 160. Also, the handler 128 controls the logging of the measured parameter data which has been collected and parsed at the call control block 126 and the position data through the GPS interface block 132 from the GPS module 120 into the flash memory 160. The data communications block 130 executes access to the server module 40 through the mobile station with the data service function when there is a data transmission request from the server module 40.

When the access process has been completed, the block 130 sends the measured parameter data stored in the flash memory 160 to the server module 40 using one of known data transmission protocols. To be more specific, the block 130 first turns on a power of the mobile station with the data service function and controls the mobile station to connect it to a modem pool(not shown) in the server module 40. When connected, the block 130 waits for until there is a data transmission request from the server module 40. When the request is received by the block 130, it transmits the measured parameter data to the sever module 40 through an inter working function(IWF) module(not shown) and the modem pool. Finally, the GPS interface block 132 receives and converts the position data and the current time data from the GPS module 120 to data with a preset format which is adapted to save it in the flash memory 160. As shown, there is used in FIG. 3 a data bus, 125, in order to communicate data and/or messages among the blocks 122, 124, 126, 128, 130, 132.

Figure 4:
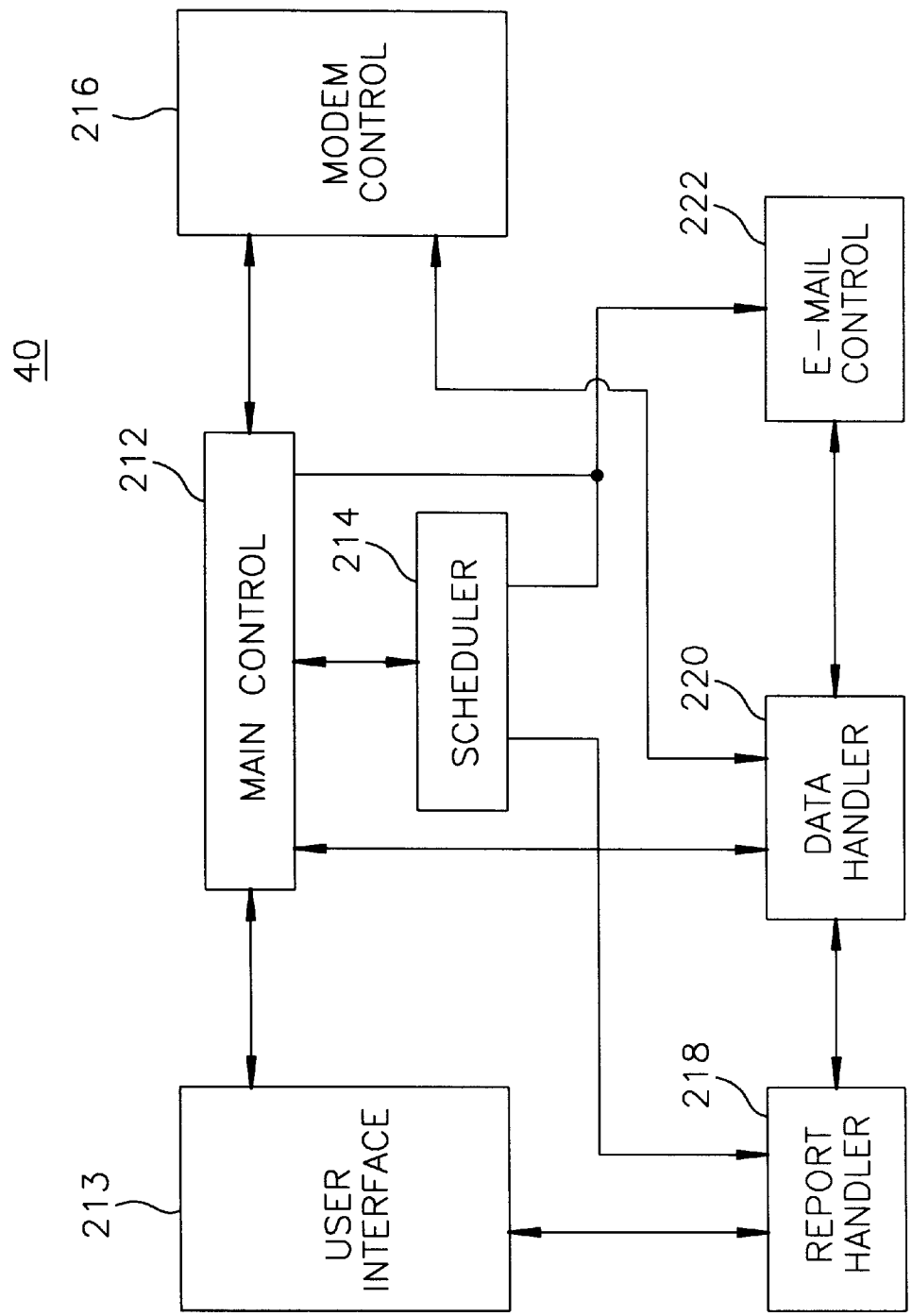
FIG. 4 represents a block diagram of a tester server included in a server module of the CDMA call tester.

FIG. 4 depicts a detailed block diagram of the server module 40 shown in FIG. 1. The module 40 includes a tester server which converts the measured parameter data from the tester 10-1 to data with a preset format for analysis thereof and manages and controls the tester 10-1 based on the analysis result. Even though there is not shown in FIG. 4 for simplicity, it should be noted that the module 40 is associated with a short message service center(SMSC), a modem pool and an IWF to communicate data between itself and the tester 10-1. Details of the SMSC, the modem pool and the IWF will be provided when explaining the whole procedure of the present invention with reference to FIG. 5 later.

The tester server, as shown in FIG. 4, includes a main control block 212, a user interface block 213, a scheduler 214, a modem control block 216, a report handler 218, a data handler 220 and an e-mail control block 222. The main control block 212, which monitors the operation of other blocks in the server and interfaces with the user interface block 213, creates and manages a predetermined process(or thread) and resources of the tester server in order to manage and control the tester 10-1. The user interface block 213 handles data used for a user to operate the tester server; and runs on windows and supports a graphic user interface for easy operation. Also, this block interfaces with the call tester 10-1 to provide interface for command transmission to the tester 10-1 and resource management. The scheduler 214 records test schedules to perform call tests at a designated time and interval given by the server operator and manages a daily report, an e-mail notification and a home page control.

The modem control block 216 controls the operation of a dialup modem(not shown) fitted in the tester server wherein the modem is used to provide function for automatic answering to calls through the mobile station from the tester 10-1. The automatic answering process is controlled by the main control block 212 which monitors the operation of the block 216. The e-mail control block 222 handles an internet e-mail system(not shown) to send data and/or messages such as the test plan program to the tester 10-1 using a short message service(SMS). This block also controls a mailing function to deliver certain reports to the SMSC via e-mail. Then, the SMSC will send messages corresponding to the reports to the mobile station using the SMS to transfer same to the tester 10-1.

The data handler 220 is to save the measured parameter data or any other information data transmitted through the modem pool from the call tester 10-1 into a preset database. Also, the handler 220 performs function to deliver query for data requested by other blocks in the tester server to the database. The report handler 218 performs function to automatically create reports requested by the user and generate printed reports through a printer connected thereto.

In addition, the tester server may include a data analyzer (not shown), which is one of software tools, to analyze the measured parameter data provided from the tester 10-1 for the performance evaluation of the base station. There may be two ways to communicate between the tester server and the tester 10-1. Specifically, the SMS is used for connecting the tester server to the tester 10-1, while the data service is used to transmit the measured parameter data from the tester 10-1 to the tester server.

Figure 5:
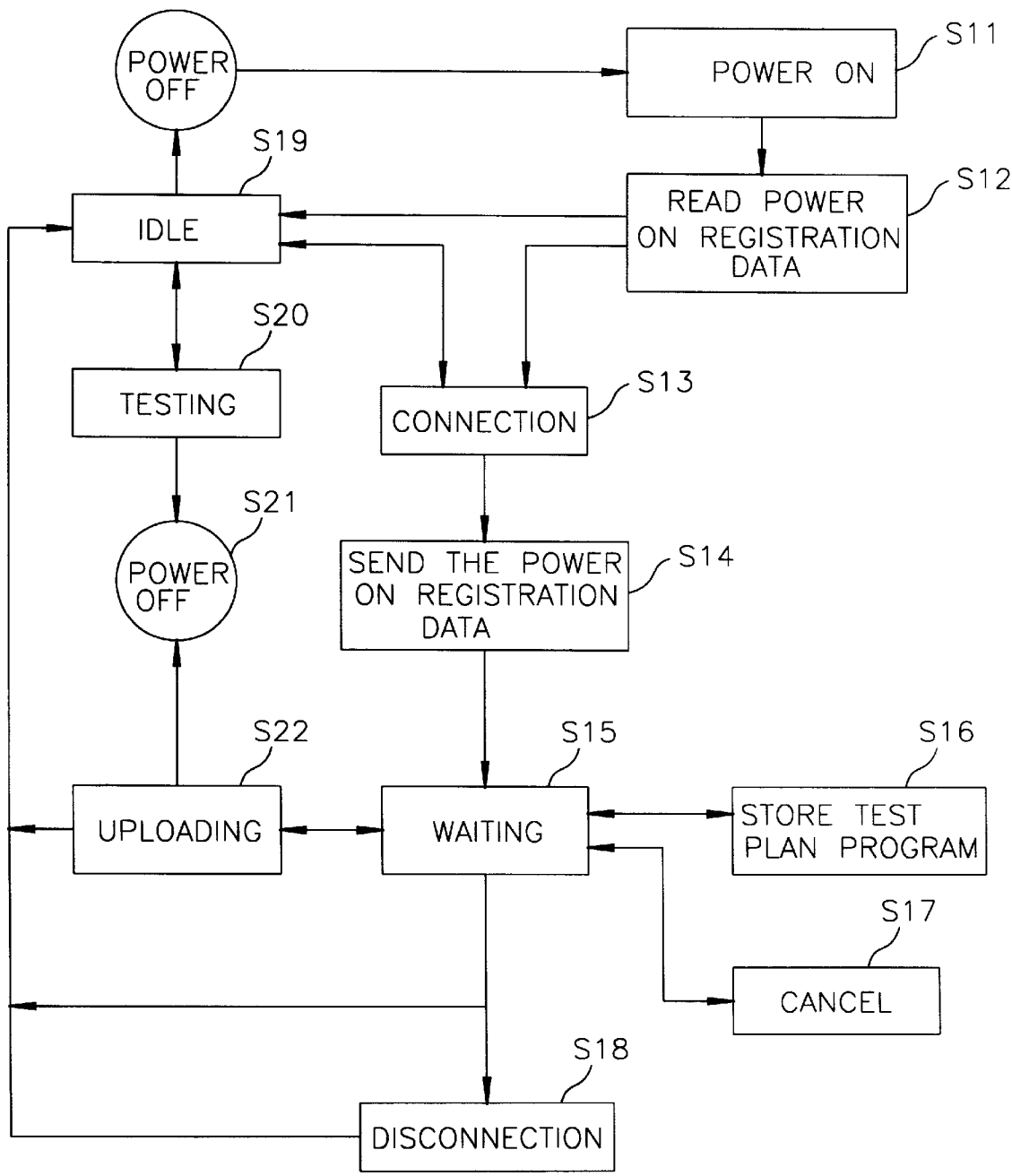
FIG. 5 offers a flow chart for describing the whole procedure for automatically measuring parameter data regarding wireless network environment in a CDMA system and transferring it to the tester server upon its request.

Hereinafter, a procedure of automatically measuring certain parameter data relating to wireless network environments and sending same to the tester server upon the server's request thereof will be described with reference to FIG. 5 in parallel with FIGS. 1–4.

The process of the present invention is initiated when a power is supplied to the tester 10-1. Specifically, if the tester 10-1 is powered up at step S11, the main control block 122 reads power-on registration data stored in the flash memory 160 at step S12. If a telephone number of the server is detected from the power-on registration data, then at step S13 the block 122 attempts a connection with the server module 40 using the mobile station with the data service function and, if otherwise, the process goes to step S19 to stand by in an idle state. In the idle state, if there is a call from the tester server using the SMS, the block 122 again attempts a connection with the tester server 40 through the mobile station using the server's telephone number contained in the SMS.

Once the connection has been made, at step S14 the block 122 sends the module 40 the power-on registration data together with the position data; and, thereafter, the process goes to step S15 to wait for until there are any instructions from the module 40. After sending the above data, if plan set instructions including the test plan program are received by the block 122, at step S16 the test plan program is extracted therefrom and stored in the flash memory 160 together with the position data and current time data issued from the GPS module 120. The test plan program may include data indicating a call mode, call type, calling time, idle time, call count, start time, etc.

The call mode data and the call type data are the same as those explained in the Background of the Invention; and, therefore, details thereof are omitted here. The calling time data represents interval of time during which a call is continued in the call-by-call state and the idle time data indicates interval of time during which no call is originated in the idle state. And the call count data stands for the total number of times of occurrence of the call origination and termination and the start time data represents a test start time.

After storing the test plan program, the position data and the current time data, the block 122 makes the connection with the module 40 disconnected at step S18 and the process returns to step S19 to remain in the idle state. In the idle state, if it is reached the test start time set in the test plan program, at step S20 the block 122 starts to measure parameter data through the mobile station with the DM function according to the test plan program. The parameter data measured according to the test plan program is collected and parsed to obtain sets of measured parameter data, each having a different kind of measured parameter data. As fully described above, the blocks, 124, 126, 128, 132, are also used to measure, gather and parse the parameter data and obtain the sets of measured parameter data.

The measured parameter data may contain data on date, time, call count, call type, fail reason, network ID(NID), BID, SID, CDMA channel number, pilot pseudonoise(PN) offset, Ec/Io, call setup time, calling time, data count, latitude, longitude, active count, candidate count, neighbor count, best PN & Ec/Io, Rx power, Tx power adjust, channel state, call event, FER, etc. The call type data, the date data, the time data, the NID data, the BID data, the calling time, the active count data, the FER data are the same as those explained above and in the Background of the Invention; and, therefore, details thereof are omitted here. The remaining terms will be briefly explained below.

That is to say, the fail reason data describes a failure reason in the event of call failure and may be obtained from a status response message from the mobile station with the DM function. The pilot PN offset data represents pilot signals with the amounts of different delay and may also be obtained from the status response message. The Ec/Io data indicates Ec/Io of the pilot signals with the amounts of different delay and may be derived from a power value in the status response message. The call setup time data represents a time duration starting from input of a telephone number to make a call to receipt of a ring back signal, i.e., to a time at which the call is made. The data count data indicates the number of the different kinds of measured parameter data as mentioned above.

Further, the latitude data and the longitude data indicate a latitude and a longitude of the tester 10-1 at which it is currently positioned in the system 100, respectively, and may be obtained through the GPS interface block 132 from the GPS module 120. The candidate count data indicates the number of candidate pilot signals which can be used as active pilot signals and may also be obtained from the status response message. The neighbor count data represents all pilot signals except the active and the candidate pilot signals and may also be derived from the status response message. The best PN & Ec/Io data describe PN and Ec/Io of the best active pilot signal among the active pilot signals, respectively, and may also be obtained from the status response message. The Rx and Tx power data represent a receiving power and a transmitting power, respectively, and may also be obtained from the status response message. The Tx power adjust data represents a reference signal used to adjust the transmitting power and may be derived from a temporal analyzer graph response from the mobile station. The channel state data represents a status of a channel through which the service is being made. The call event represents a status of call and may be obtained from the call mode data.

If the test process has successfully been completed, then the sets of measured parameter data are logged into the flash memory 160 for transmission to the server module 40. The completion of the process, for example, may be detected by monitoring and counting the repeated number of times of the call-by-call test and the idle test.

Thereafter, the process returns to step S19 to stand by in the idle state and then attempts a connection with the server module 40 according to the test plan program. If the connection has been made, the block 122 informs the module 40 of the power-on registration data and waits for until there are any further instructions from the server module 40 at step S15. If there are data request instructions from the module 40, at step S22 the block 122 starts to transmit the sets of measured parameter data logged into the flash memory 160 to the module 40 through the components coupled therebetween. If the data transmission has been completed, then the process cuts off the connection with the module 40 at step S18 and then returns to step S19 to remain in the idle state.

After sending the power-on registration data at step S14, if there are data cancel instructions from the module 40, at step S17 the block 122 may eliminate all data logged into the flash memory 160 and cut off the connection with the module 40 at step S18; and, thereafter, the process returns to step S19 to stay in the idle state. In the idle state, the tester 10-1 is always power on but may be power off by mistake or due to an instantaneous power failure.

In addition, if the test process is interrupted due to a disruption of the supply of the power to the tester 10-1 during the test operation at step S20, all measured data stored in the flash memory 160 may be sent to the module 40 immediately. Further, if there occurs a disconnection in the communications with the module 40 during the uploading of the sets of measured parameter data at step S22, the process may return to step S19 and then may attempt a connection with the module 40 at step S13. If the connection has been made, the block 122 informs the module 40 of the power-on registration data including the disconnection information at step S14. Thereafter, if there are data resending request instructions from the module 40, the block 122 resends the sets of measured parameter data to the module 40 at step S22 and cuts off the connection with the module 40; and then also returns to step S19 to remain in the idle state. However, if the power to the tester 10-1 is off during the transmission of the sets of measured parameter data, it is possible to resend same to the module 40 only when the power is resupplied to the tester 10-1.

As described early, the call test method and apparatus in accordance with the present invention employ an efficient call test scheme which automatically measures various parameter data regarding wireless network environments and send same to the server upon the request. The invention, therefore, has an advantage compared to the prior art call tester in that the it does not require an operator and is very convenient in view of the above.

While the present invention has been shown and described with respect to the particular embodiments, it will be apparent to those skilled in the art that many changes and modifications may be made without departing from the spirit and scope of the invention as defined in the appended claims.

What is claimed is:

1. A method for automatically measuring parameter data relating to wireless network environments within a service coverage of a base station in a code division multiple access(CDMA) system having at least one call tester and a server, which comprises the steps of:

(a) detecting a server's telephone number from power-on registration data representing a current test state stored in a storage device, wherein the power-on registration data contains information indicating a start, interruption and end of the test in the tester;

(b) attempting, at the call tester, a connection with the server through a mobile station with a data service function using the server's telephone number;

(c) if there is test plan program data from the server after the connection is made, starting to measure the parameter data using another mobile station with a diagnostic monitor(DM) function on the basis of the test plan program data; and (d) collecting and parsing the measured parameter data to obtain sets of measured parameter data, each set having a different kind of measured parameter data, and transmitting the sets of measured parameter data to the server using the mobile station with the data service function when there is a data transmission request from the server.

2. The method of claim 1, wherein the call tester is installed at a fixed place.

3. The method of claim 1, wherein the call tester is installed in a movable object.

4. The method of claim 3, wherein, at the step(c), the parameter data is measured by using information representing a position at which the call tester is currently located in the CDMA system when reaching a test start time included in the test plan program data.

5. The method of claim 4, wherein the position information is obtained from a global positioning system associated with the call tester.

6. The method of claim 5, wherein the step(c) includes the steps of:
- (c1) receiving, at a short message service center(SMSC) connected to the server, the test plan program data from the server via e-mail and sending it to the mobile station with the data service function by using a short message service(SMS); and
- (c2) receiving, at the mobile station, the test plan program data from the SMSC and relaying it to the call tester via a communications network.

7. The method of claim 1, wherein the step(d), prior to transmitting the sets of measured parameter data, includes the step of decoding and storing them in the storage device.

8. The method of claim 7, wherein the step(d) includes the steps of:
- (d1) turning on a power of the mobile station with the data service function and attempting a connection with a modem connected to the server; and
- (d2) if there is the data transmission request from the server after the connection is made, sending the sets of decoded measured parameter data stored in the storage device to the server through the modem using an inter working function.

9. An apparatus for automatically measuring parameter data relating to wireless network environments within a service coverage of a base station in a code division multiple access(CDMA) system, which comprises:
- means for detecting a server's telephone number from power-on registration data representing a current test state stored in a storage device, wherein the power-on registration data contains information indicating a start, interruption and end of the test;
- means for attempting a connection with the server through a mobile station with a data service function using the server's telephone number;
- means for receiving, if there is test plan program data from the server after the connection is made, the test plan program data and measuring the parameter data using another mobile station with a diagnostic monitor (DM) function based on the test plan program data; and
- means for collecting and parsing the measured parameter data to obtain sets of measured parameter data, each set having a different kind of measured parameter data, and transmitting the sets of measured parameter data to the server when there is a data transmission request from the server.

10. The apparatus of claim 9, wherein the apparatus is installed at a fixed place.

11. The apparatus of claim 9, wherein the apparatus is installed in a movable object.

12. The apparatus of claim 11, wherein the parameter data is measured by using information representing a position at which the apparatus is currently located in the CDMA system when reaching a test start time included in the test plan program data.

13. The apparatus of claim 12, wherein the position information is obtained from a global positioning system associated with the apparatus.

14. The apparatus of claim 13, wherein the receiving and measuring means includes:
- a short message service center(SMSC) for receiving the test plan program data from the server via e-mail and sending it to the mobile station with the data service function by using a short message service(SMS); and
- means for receiving the test plan program data from the mobile station via a communications network.

15. The apparatus of claim 11, wherein the collecting, parsing and transmitting means, prior to transmitting the sets of measured parameter data, includes means for decoding and storing them in the storage device.

16. The apparatus of claim 15, wherein the collecting, parsing and transmitting means includes:
- means for turning on a power of the mobile station with the data service function and attempting a connection with a modem connected to the server; and
- means for sending, if there is the data transmission request from the server after the connection is made, the sets of decoded measured parameter data stored in the storage device to the server through the modem using an inter working function.

17. A data communications system in a code division multiple access(CDMA) system, the data communications system having a call tester and a server, wherein the call tester comprises:
- means for detecting a server's telephone number from power-on registration data representing current test state stored in a storage device, wherein the power-on registration data contains information relating to a start, interruption and end of the test in the tester;
- means for attempting a connection with the server through a mobile station with a data service function using the server's telephone number;
- means for receiving, if there is test plan program data from the server after the connection is made, the test plan program data and measuring parameter data relating to wireless network environments within a service coverage of a base station in the CDMA system using another mobile station with a diagnostic monitor(DM) function based on the test plan program data; and
- means for collecting and parsing the measured parameter data to obtain sets of measured parameter data, each set having different kind of measured data, and transmitting the sets of measured parameter data to the server when there is a data transmission request from the server; and wherein the server comprises:
  - means for providing test schedules for the call tester to operate based thereon;
  - means for handling data input and output for the server user to operate the server and supporting a graphic user interface;
  - means for handling internet e-mail system to send messages including the test plan program data to the call tester and deliver reports to the mobile station with the data service function; and
  - means for saving the sets of measured parameter data transmitted through the mobile station and a modem from the call tester in a database.

18. The system of claim 17, wherein the call tester is installed in a movable object.

19. The system of claim 18, wherein the parameter data is measured by using information representing a position at which the call tester is currently located in the CDMA system when reaching a test start time included in the test plan program data.

20. The system of claim 19, wherein the position information is obtained from a global positioning system associated with the call tester.

* * * * *